US005754672A

United States Patent [19]

Monzen et al.

[11] Patent Number: 5,754,672

[45] Date of Patent: May 19, 1998

[54] DEFLECTION DETECTIVE DEVICE FOR DETECTING THE DEFLECTION OF SUSPENDED CARGO

[75] Inventors: Tadaaki Monzen, Tokyo; Yoshiaki Ohkubo, Hiroshima, both of Japan

[73] Assignee: Mitsubishi Jukogyo Kabushiki Kaisha, Tokyo, Japan

[21] Appl. No.: 528,154

[22] Filed: Sep. 14, 1995

[30] Foreign Application Priority Data

Nov. 30, 1994 [JP] Japan ........ 6-321416

[51] Int. Cl.$^6$ ........ G06K 9/00

[52] U.S. Cl. ........ 382/107; 212/232; 382/287; 382/289

[58] Field of Search ........ 382/107, 103, 382/104, 236, 287, 289, 296, 154; 212/270, 255, 256, 232; 414/138.3, 139.7; 294/81.4

[56] References Cited

U.S. PATENT DOCUMENTS 4,385,028 5/1983 Salaman ........ 376/264

5,152,408 10/1992 Tax et al. ........ 212/270

5,173,945 12/1992 Pieters et al. ........ 382/107

*Primary Examiner*—Joseph Mancuso

*Attorney, Agent, or Firm*—Wenderoth, Lind & Ponack

[57] ABSTRACT

A deflection device allows deflection correction control of suspended cargo for deflections having both parallel deflection and skew deflection components. The suspended cargo is held by a suspension tool suspended from a trolley via ropes and is carried together with movement of the trolley. The device has mark detectors provided under the trolley with a range of vision facing downwardly and a corresponding plurality of marks provided opposite of the mark detectors on the suspension tool. A picture processing device generates picture signals of the first and second marks detected by the mark detectors. A deviation amount computing device calculates the deviation of the first and second marks, and a deflection amount calculating device calculates the amount of parallel deflection and the amount of skew deflection based on the computed deviation amount.

26 Claims, 5 Drawing Sheets

DEFLECTION DETECTIVE DEVICE FOR DETECTING THE DEFLECTION OF SUSPENDED CARGO

BACKGROUND OF THE INVENTION

1. Field of the Invention

The present invention relates to a device for detecting the deflection of suspended cargo, e.g. cargo suspended from a crane.

2. Description of the Prior Art

A conventional deflection detecting device for detecting the deflection of cargo suspended from a container crane is described in relation to FIG. 4. Numeral 1 designates a trolley moving laterally on a crane (moving right and left in the figure), numeral 2 designates a suspension tool suspended from the trolley 1 via ropes 2a, and numeral 3 designates suspended cargo held by the suspension tool 2.

As shown in FIG. 4, when the trolley 1 is moved from left to right and is accelerated, the suspended cargo 3 deflects relatively to the left side of the figure by an inertia force. Likewise, the suspended cargo 3 deflects relatively to the right side of the figure by an inertia force when the trolley 1 is decelerated. In this case, the suspended cargo 3 deflects, in the parallel direction with the trolley movement, with a same period and with a same phase at both the front end and the rear end, i.e. a parallel deflection. As shown in FIGS. 5(A) and 5(B), this deflection occurs from a position shown by a full line to a position shown by a broken line. Further, if there is an eccentric load in the suspended cargo 3 or if an outside force such as wind acts nonuniformly on a side of the suspended cargo 3, the suspended cargo 3 causes rotational movements, including lateral components of movement, and a skew deflection results. As shown in FIGS. 6(A) and 6(B), this deflection occurs from a position shown by a full line to a position shown by a broken line. Thus movements wherein parallel deflections and skew deflections are commingled, arise.

A camera 4, fitted to the trolley 1 with its range of vision facing downwardly, detects a mark 5 attached to the suspension tool 2. When there is no relative movement between the suspension tool and the trolley, the mark is located at the center of the range of vision. The mark 5 is preferably white on a surrounding black background. This color scheme is preferred since light and shade are easily distinguishable. The camera 4 then sends a picture signal representing the mark 5 to a picture processing device 6, as shown in FIG. 4. The picture processing device 6 detects the position of the mark 5 within the range of vision of the camera 4. It then computes the amount of deviation of the mark 5 by counting the number of picture elements between the position of the mark and the center of the range of vision. An amount of deflection is obtained by multiplying this amount of deviation by an actual length per picture element. This actual length is a function of the length of rope between the trolley 1 and the suspension tool 2. However, in a conventional deflection detecting device, in which one camera is used to detect the movement of one mark, only parallel deflections of the suspended cargo can be detected. There is a disadvantage in that skew deflections, i.e. rotational deflections cannot be detected. Accordingly, the deflection detecting device of the prior art has a problem that deflection correction control is possible for parallel deflections but not for skew deflections. Thus deflection correction controls for movements which have both parallel deflections and skew deflections cannot be accomplished.

SUMMARY OF THE INVENTION

In view of the above-described problems inherent in the prior art, it is an object of the present invention to provide a deflection detecting device which allows deflection correction control for both parallel deflections and skew deflections. The present invention therefore enhances the carrying efficiency of suspended cargo by shortening the time required for correction of such deflections.

The present invention therefore relates to a deflection detecting device for detecting a deflection of cargo suspended from a suspension tool which is suspended from a trolley via ropes. The cargo is carried together with the movement of the trolley. The present invention has a mark detection means provided under the trolley. The range of vision of the mark detection means faces downwardly toward the suspension tool. The present invention also has first and second marks which are provided on the suspension tool so as to correspond to the mark detection means. A picture processing device generates first and second picture signals which represent the first mark and the second mark respectively. A deviation amount calculating means calculates the amount of deviation of the first and second marks and a deflection amount calculating means calculates a parallel deflection amount and a skew deflection amount based on the amounts of deviation.

According to the present invention, first and second marks on a suspension tool are detected as picture signals by a mark recognition means provided under a trolley. From these picture signals, mark positions are detected and an amount of deviation between the mark positions and the center of the picture is obtained. From this amount of deviation the amount of deflection of both sides, right and left, of the suspended cargo is computed. From this amount of deflection a parallel deflection and a skew deflection are determined. In addition to parallel deflections, skew deflections caused by eccentric loads or outside forces such as wind also become detectable. These skew deflections represent rotation which includes lateral movement components. Therefore, deflection correction controls for deflections both parallel deflections and skew deflections can be accomplished.

DESCRIPTION OF THE PREFERRED EMBODIMENTS

Figure 1:
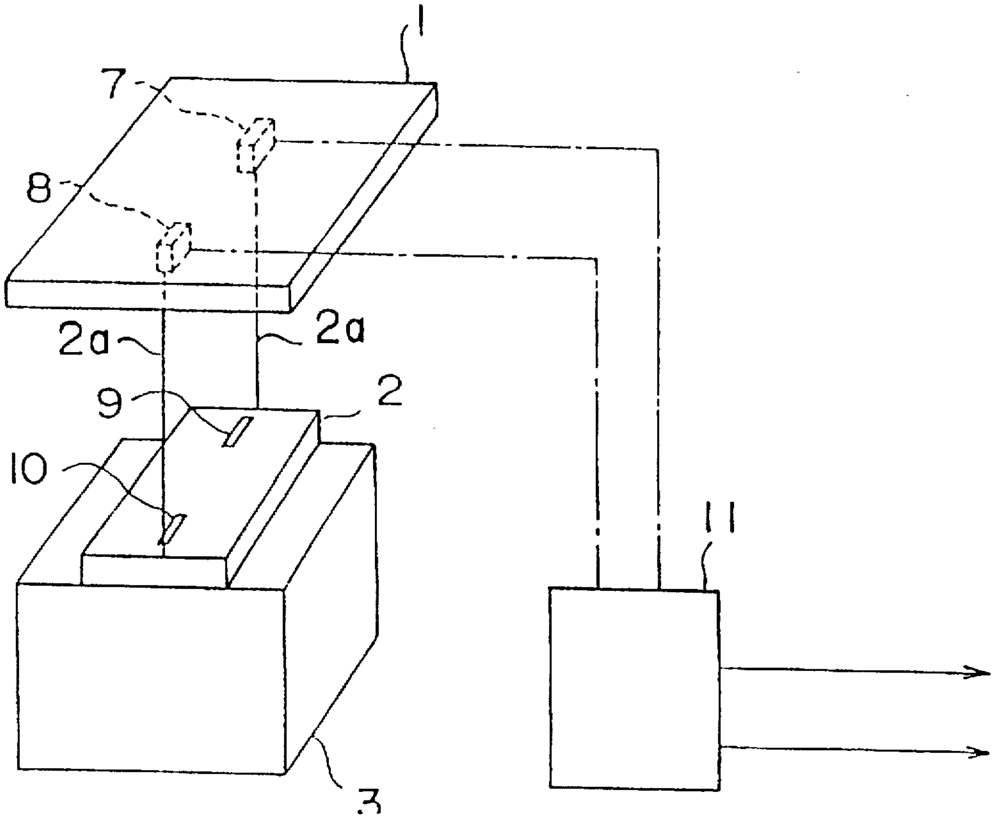
FIG. 1 is an explanatory drawing by way of an entire perspective illustration showing a deflection detecting device of one preferred embodiment according to the present invention.
Figure 2:
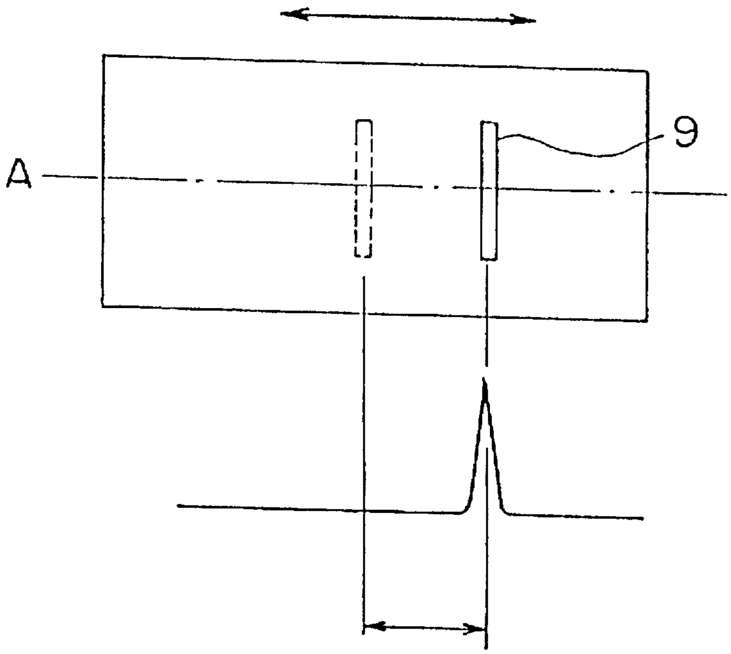
FIG. 2 is an explanatory drawing showing how a deflection of a suspended cargo of FIG. 1 is detected.
Figure 3:
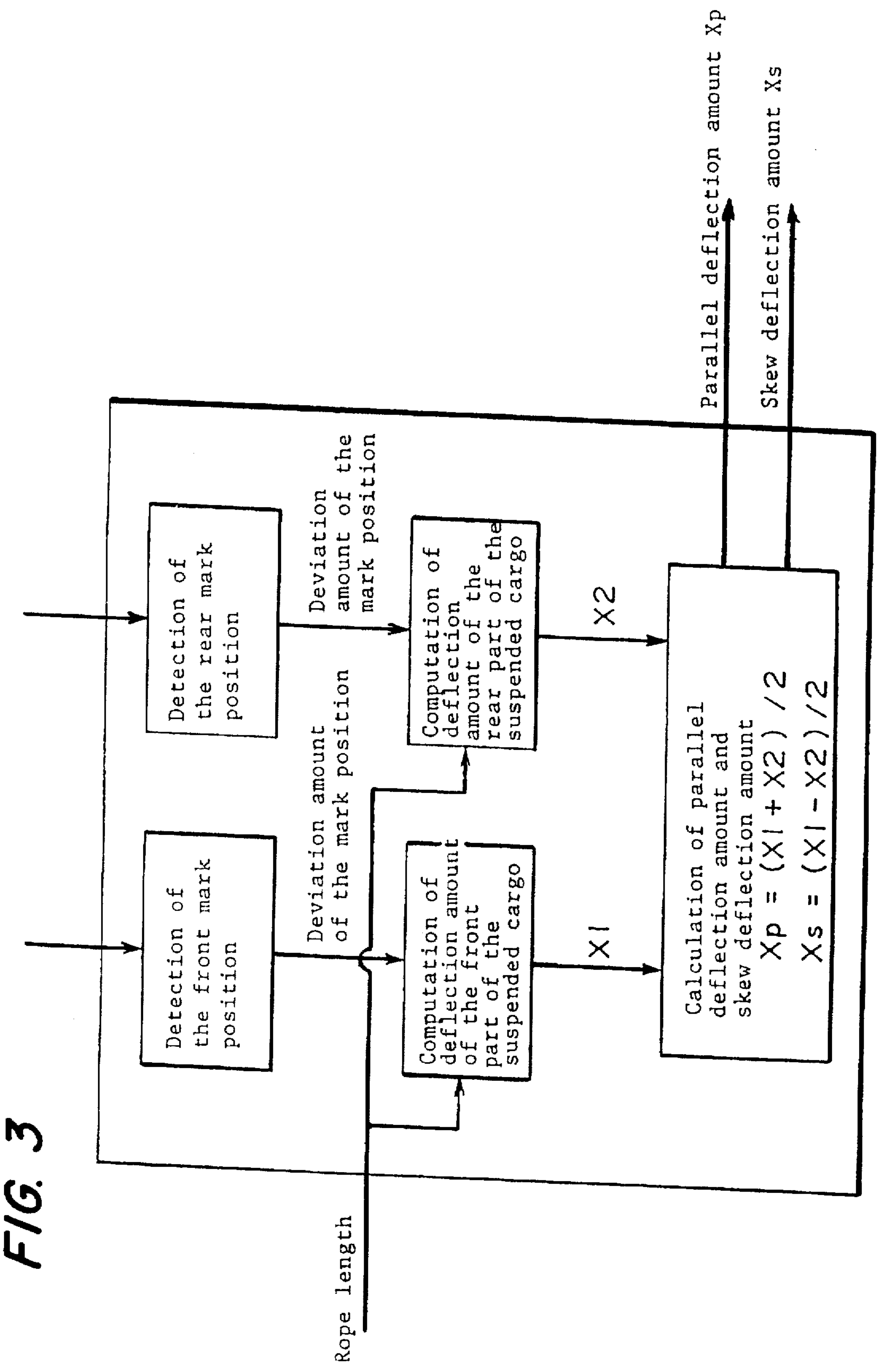
FIG. 3 is an enlarged block diagram showing a processing method of a picture processing device of FIG. 1.
Figure 4:
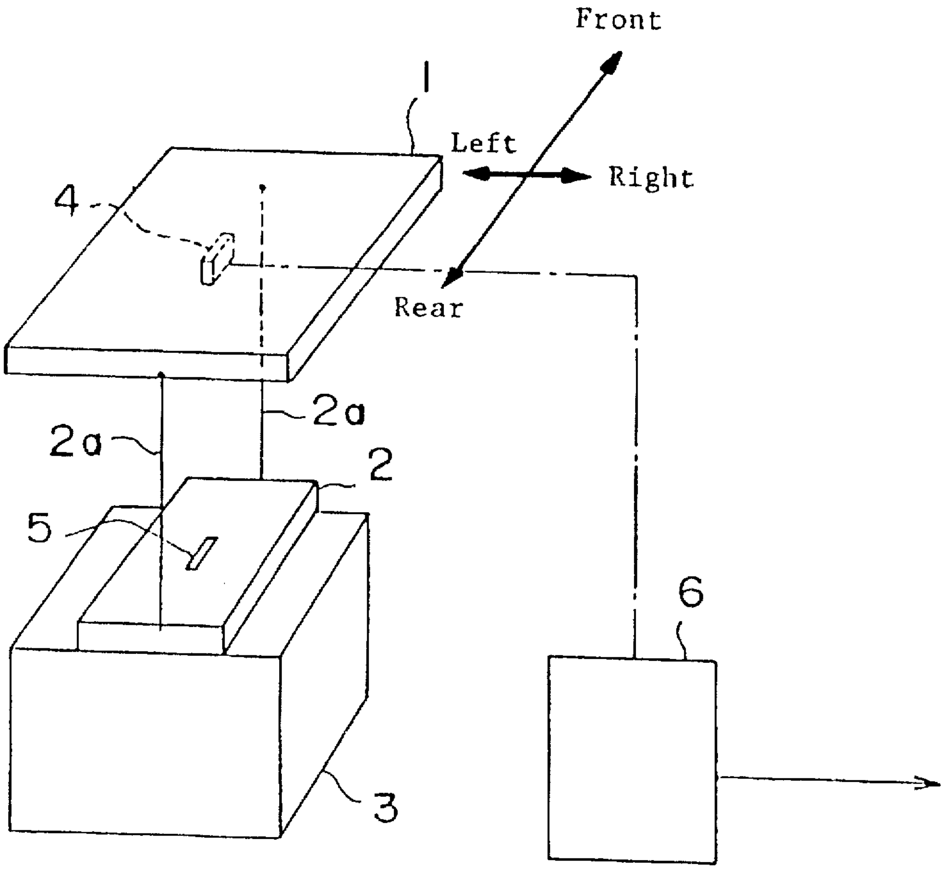
FIG. 4 (Prior Art)
FIG. 4 is an entire perspective illustration showing a deflection detecting device of a suspended cargo used in a container crane of the prior art.
Figure 5A:
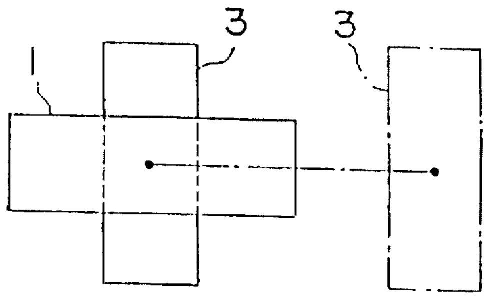
FIG. 5(A) (Prior Art)
FIG. 5(A) a plan view of parallel deflection of a suspended cargo of FIG. 4.
Figure 5B:
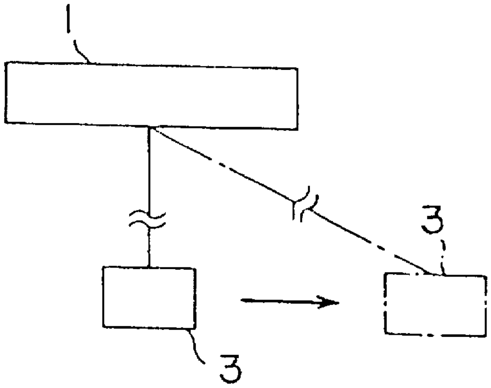
FIG. 5(B) (Prior Art)
FIG. 5(B) is an elevational view of a parallel deflection of a suspended cargo of FIG. 4.
Figure 6A:
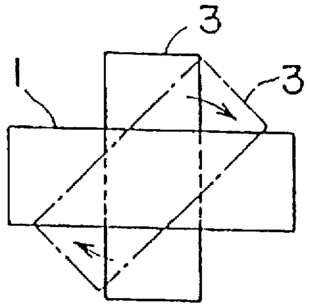
FIG. 6(A) (Prior Art)
FIG. 6(A) a plan view of a skew deflection of suspended cargo of FIG. 4.
Figure 6B:
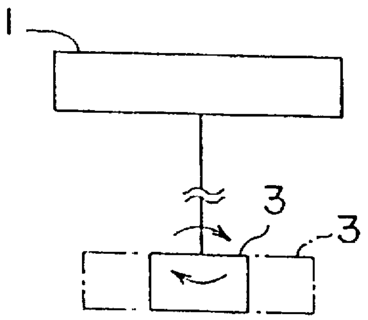
FIG. 6(B) (Prior Art)
FIG. 6(B) is an elevational view of a skew deflection of a suspended cargo of FIG. 4.

In FIGS. 1–3, component parts similar to those shown in FIG. 4 are given like reference numerals. In FIG. 1, a pair of cameras, front and rear, are fitted to a trolley 1, facing to a pair of marks, front (first) and rear (second) 9 and 10 attached on a suspension tool 2. The front camera 7 detects the front mark 9 and the rear camera 8 detects the rear mark 10. Thus the front and the rear cameras 7 and 8 send signals representing the front and the rear marks 9 and 10, respectively, to a picture processing device 11.

The front mark 9 and the rear mark 10, both provided on the suspension tool 2, are, for example, lines drawn in white on a black background, so that the mark portion and the surrounding portion are clearly distinguished by colors of light and shade.

The two picture signals generated by the pair of cameras are processed by the picture processing device 11, as shown in FIG. 3. The position of the marks is detected as shown in FIG. 2. A picture image is obtained by digitizing a picture signal and a luminance level is scanned on a horizontal line A so as to find a peak point of the luminance. This peak point is the mark position. When the deflection is zero (a mark position shown by dotted lines in FIG. 2), the mark position is located at a picture center. The amount of deviation between the mark position and the picture center is computed by counting the number of picture elements therebetween.

The actual length per one picture element is decided based on the length of rope between a camera and a mark, or between the trolley and the suspension tool. The actual length of rope is used in a previously set up correlation formula. The amount of deflection is obtained by multiplying the amount of deviation by the actual length per picture element.

Thus, from the deflection amounts $X_1$ and $X_2$ of the front part and the rear part of the suspended cargo obtained by the picture processing device, the parallel deflection amount $X_p$ and the skew deflection amount $X_s$ are obtained by use of formula (1) below. Therefore, both the parallel deflection amount and skew deflection amount are detected.

$$X_p=(X_1+X_2)/2 \qquad \text{Formula (1)}$$

$$X_s=(X_1-X_2)/2$$

In this preferred embodiment, a camera is used as a mark recognition means. However, a picture signal may be generated by other means, such as a laser beam receiver or an infrared camera, etc., yielding the same function and effect as mentioned above.

If a camera is used, a mark of luminous material, etc., can be used in addition to the mark of the above-described preferred embodiment. If a laser beam receiver is used, a mark of luminous material, etc., can be used, and if an infrared camera is used, an infrared mark, etc., can be used, respectively. Although two cameras are used in this preferred embodiment, the present invention is not limited thereto. The use of three or more mark detection means is also possible and yields the same function and effect.

As a summary, according to the present invention, the deflection detecting device of the present invention is for use, for example, in a crane in which a suspended cargo is held by a suspension tool suspended from a trolley via ropes and the suspended cargo is carried together with movement of the trolley. The deflection detecting device comprises a mark detection means provided under the trolley with its range of vision facing downwardly. First and second marks, such as signs, etc. are provided opposite of the mark detection means on the suspension tool. The deflection detecting device further comprises a picture processing device to generate a picture signal of the first mark on the suspension tool and a picture signal of the second mark on the suspension tool generated by the mark recognition means provided under the trolley. A deviation amount computing means computes the deviation of both sides of the suspended cargo in the picture processing device and from these deviations the deflection of both marks is computed. A deflection amount calculating means calculates the amount of parallel deflection and the amount of skew deflection based on the computed deflection of both marks. Thus the device makes possible deflection correction control for deflections which have both parallel deflection and skew deflection components. The device thereby enhances a carrying efficiency of a suspended cargo by shortening the amount of time required for correction of such deflections.

What is claimed is:

1. A deflection calculating device comprising:

a first mark and a second mark;

mark detection means movable in a direction of motion for detecting said first mark and said second mark and for generating a first picture signal and a second picture signal representative of said first and second marks respectively and wherein, said mark detection means has a range of vision represented by a number of picture elements, and said first and second marks are movable with respect to said mark detection means along, and laterally with respect to, said direction of motion;

a picture processing device for determining a first mark position from said first picture signal and for determining a second mark position from said second picture signal, wherein, when there is no relative movement between said mark detection means and said first and second marks, said first mark position and said second mark position are located at a picture center of said range of vision of said mark detection means, and when there is relative movement between said mark detection means and said first mark, said first mark position deviates from said picture center, and when there is relative movement between said mark detection means and said second mark, said second mark position deviates from said picture center;

a deviation amount calculating means for calculating an amount of deviation of said first mark by counting the number of picture elements between said first mark position and said picture center and for calculating an amount of deviation of said second mark by counting the number of picture elements between said second mark position and said picture center; and a deflection amount calculating means for calculating, based on said amount of deviation of said first mark and said amount of deviation of said second mark, a parallel deflection amount, which represents the amount of relative movement between said mark detection means and said first and second marks along said direction of motion, and a skew deflection amount, which represents the amount of lateral movement of said first and second marks with respect to said direction of motion.

2. A deflection calculating device as claimed in claim 1, wherein said mark detection means comprises a pair of detectors which are provided in two positions so as to correspond to each of said first and second marks.

3. A deflection calculating device as claimed in claim 2, wherein said detectors comprise cameras.

4. A deflection calculating device as claimed in claim 2, wherein said detectors comprise laser beam receivers.

5. A deflection calculating device as claimed in claim 2, wherein said detectors comprise infrared receivers.

6. A deflection calculating device as claimed in claim 1, wherein said picture processing device determines said first mark position by detecting a peak in said first picture signal and determines said second mark position by detecting a peak in said second picture signal.

7. A deflection calculating device as claimed in claim 1, wherein said deflection amount calculating means calculates said parallel deflection amount according to the formula $X_P=(X_1+X_2)/2$ and said skew deflection amount according to the formula $X_S=(X_1-X_2)/2$ where $X_1$ is a deflection amount of said first mark based on said amount of deviation of said first mark and the distance between said mark detection means and said first mark and $X_2$ is a deflection amount of said second mark based on said amount of deviation of said second mark and the distance between said mark detection means and said second mark.

8. A deflection calculating device as claimed in claim 1, wherein said first mark and said second mark are spaced apart from each other in a direction which is transverse to the direction of motion of said mark detection means.

9. A deflection calculating device for use in detecting deflection of cargo on an assembly which has a trolley movable in a direction of motion and a suspension tool suspended from and movable with respect to the trolley for holding the cargo, said deflection device comprising:

a first mark and a second mark to be provided on the suspension tool;

mark detection means to be provided on the trolley for detecting said first mark and said second mark and for generating a first picture signal and a second picture signal representative of said first and second marks respectively and wherein, said mark detection means has a range of vision represented by a number of picture elements, and said first and second marks are movable with respect to said mark detection means along, and laterally with respect to, said direction of motion;

a picture processing device for determining a first mark position from said first picture signal and for determining a second mark position from said second picture signal, wherein, when there is no relative movement between said mark detection means and said first and second marks, said first mark position and said second mark position are located at a picture center of said range of vision of said mark detection means, and when there is relative movement between said mark detection means and said first mark, said first mark position deviates from said picture center, and when there is relative movement between said mark detection means and said second mark, said second mark position deviates from said picture center;

a deviation amount calculating means for calculating an amount of deviation of said first mark by the number of picture elements between said first p291X counting position mark and said picture center and for calculating an amount of deviation of said second mark by counting the number of picture elements between said second mark position and said picture center; and a deflection amount calculating means for calculating, based on said amount of deviation of said first mark and said amount of deviation of said second mark, a parallel deflection amount, which represents the amount of relative movement between said mark detection means and said first and second marks along said direction of motion, and a skew deflection amount, which represents the amount of lateral movement of said first and second marks with respect to said direction of motion.

10. A deflection calculating device as claimed in claim 9, wherein said mark detection means comprises a pair of detectors which are to be provided under the trolley in two positions so as to correspond to each of said first and second marks.

11. A deflection calculating device as claimed in claim 10, wherein said detectors comprise cameras.

12. A deflection calculating device as claimed in claim 10, wherein said detectors comprise laser beam receivers.

13. A deflection calculating device as claimed in claim 10, wherein said detectors comprise infrared receivers.

14. A deflection calculating device as claimed in claim 9, wherein said picture processing device determines said first mark position by detecting a peak in said first picture signal and determines said second mark position by detecting a peak in said second picture signal.

15. A deflection calculating device as claimed in claim 9, wherein said deflection amount calculating means calculates said parallel deflection amount according to the formula $X_P=(X_1+X_2)/2$ and said skew deflection amount according to the formula $X_S=(X_1-X_2)/2$ where $X_1$ is a deflection amount of said first mark based on said amount of deviation of said first mark and the distance between said mark detection means and said first mark and $X_2$ is a deflection amount of said second mark based on said amount of deviation of said second mark and the distance between said mark detection means and said second mark.

16. A deflection calculating device as claimed in claim 9, wherein said first mark and said second mark are spaced apart from each other in a direction which is transverse to the direction of motion of the trolley.

17. A deflection calculating device as claimed in claim 16, wherein said first mark and said second mark are situated such that the cargo is to be located between said first mark and said second mark with respect to said direction which is transverse to the direction of motion of the trolley.

18. An assembly for use in moving suspended cargo, said assembly comprising:

a trolley movable in a direction of motion;

a suspension tool suspended from and movable with respect to said trolley for holding the cargo;

a first mark and a second mark provided on said suspension tool;

mark detection means provided on said trolley for detecting said first and second marks and for generating a first picture signal and a second picture signal representative of said first and second marks respectively, and wherein, said mark detection means has a range of vision represented by a number of picture elements, and said first and second marks together with said suspension tool are movable with respect to said mark detection means along, and laterally with respect to, said direction of motion;

a picture processing device for determining a first mark position from said first picture signal and for determining a second mark position from said second picture signal, wherein, when there is no relative movement between said mark detection means and said first and second marks, said first mark position and said second mark position are located at a picture center of said range of vision of said mark detection means, and when there is relative movement between said mark detection means and said first mark, said first mark position deviates from said picture center, and when there is relative movement between said mark detection means and said second mark, said second mark position deviates from said picture center;

a deviation amount calculating means for calculating an amount of deviation of said first mark by counting the number of picture elements between said first mark position and said picture center and for calculating an amount of deviation of said second mark by counting the number of picture elements between said second mark position and said picture center; and a deflection amount calculating means for calculating, based on said amount of deviation of said first mark and said amount of deviation of said second mark, a parallel deflection amount, which represents the amount of relative movement between said mark detection means and said first and second marks along said direction of motion, and a skew deflection amount, which represents the amount of lateral movement of said first and second marks with respect to said direction of motion.

19. An assembly as claimed in claim 18, wherein said mark detection means comprises a pair of detectors which are provided under said trolley in two positions so as to correspond to each of said first and second marks.

20. An assembly as claimed in claim 19, wherein said detectors comprise cameras.

21. An assembly as claimed in claim 19, wherein said detectors comprise laser beam receivers.

22. An assembly as claimed in claim 19, wherein said detectors comprise infrared cameras.

23. An assembly as claimed in claim 18, wherein said picture processing device determines said first mark position by detecting a peak in said first picture signal and determines said second mark position by detecting a peak in said second picture signal.

24. An assembly as claimed in claim 18, wherein said deflection amount calculating means calculates said parallel deflection amount according to the formula $X_P=(X_1+X_2)/2$ and said skew deflection amount according to the formula $X_S=(X_1-X_2)/2$ where $X_1$ is a deflection amount of said first mark based on said amount of deviation of said first mark and the distance between said mark detection means and said first mark and $X_2$ is a deflection amount of said second mark based on said amount of deviation of said second mark and the distance between said mark detection means and said second mark.

25. A deflection calculating device as claimed in claim 18, wherein said first mark and said second mark are spaced apart from each other in a direction which is transverse to said direction of motion of said trolley.

26. A deflection calculating device as claimed in claim 25, wherein said first mark and said second mark are situated such that the cargo is to be located between said first mark and said second mark with respect to said direction which is transverse to the direction of motion of the trolley.

* * * * *